United States Patent [19]

Kappel

[11] Patent Number: 5,186,580
[45] Date of Patent: Feb. 16, 1993

[54] METHOD OF LAYING A PIPE ON A SEA FLOOR FOR THE TRANSPORTATION OF A FLUID

[76] Inventor: Jens J. Kappel, Hovmosevej 4, Gadevang, DK-3400 Hillerφd, Denmark

[21] Appl. No.: 689,765
[22] PCT Filed: Nov. 30, 1989
[86] PCT No.: PCT/DK89/00283
   § 371 Date: May 30, 1991
   § 102(e) Date: May 30, 1991
[87] PCT Pub. No.: WO90/06466
   PCT Pub. Date: Jun. 14, 1990

[30] Foreign Application Priority Data
Nov. 30, 1988 [DK] Denmark .............. 6697/88

[51] Int. Cl.$^5$ ............................................. F16L 1/04
[52] U.S. Cl. ...................... 405/169; 166/343; 166/347; 405/158; 405/170
[58] Field of Search ............... 405/158, 172, 171, 170, 405/169, 167, 165, 166; 166/347, 343, 342, 350

[56] References Cited

U.S. PATENT DOCUMENTS

| Re. 28,410 | 5/1975 | Cox et al. ............. 405/172 X |
| 3,491,541 | 1/1970 | Berard ........................ 405/166 |
| 3,608,321 | 9/1971 | Richardson et al. .......... 405/170 |
| 3,693,665 | 9/1972 | Veerling et al. ............ 285/47 X |
| 3,770,304 | 11/1973 | Reyser ...................... 285/288 X |
| 3,835,707 | 9/1974 | Rosa et al. ................ 405/166 X |
| 3,880,195 | 4/1975 | Goodrich et al. .......... 285/288 X |
| 4,150,911 | 1/1979 | Droste et al. . |
| 4,710,059 | 12/1987 | Hazlegrore et al. ......... 405/158 X |
| 4,718,459 | 1/1988 | Adorjan .................... 405/158 X |

FOREIGN PATENT DOCUMENTS 3218423 11/1983 Fed. Rep. of Germany .
2909475 1/1986 Fed. Rep. of Germany .
136475 5/1977 Norway .

OTHER PUBLICATIONS

"Large Deflection Upheaval Buckling of Marine Pipelines", P. Terndrup Pedersen, J. Michelsen, (BOSS) Trondheim, Norway, pp. 1-20, Jun. 1988.
"Upheaval Creep of Buried Heated Pipelines with Initial Imperfections", P. Terndrup Pedersen, J. Juncher Jensen, Marine Structures 1, pp. 11-22, Feb. 1988.
"New Design Criteria for Upheaval Creep of Buried Sub-Sea Pipelines", N. J. Nielsen, P. T. Pendersen, Grundy and Lyngberg, pp. 243-249, Feb. 1988.
Fernwarme International, May 1980, W. Lippoth and W. Kuhlmann, "Vorgespannte Stahlmantelrohrleitunhgun", pp. 377-379.
Fernwarme International, May 1982, R. Bunte, "Vorspannung von Stahlmantel Rohrleitungen (eletrisch, thermisch, hydraulisch)", pp. 318-320 vol. 100 , No. 4, p. 1597 (Jun. 30, 1981).
Gas Journal-Transmission and Distribution, vol. 333, No. 5438, Jan. 1968, "Prestressing pipelines", pp. 58-70.
International Search Report, Intl. Appl. No. PCT/DK 89/00283.

Primary Examiner—Dennis L. Taylor
Attorney, Agent, or Firm—Rothwell, Figg, Ernst & Kurz

[57] ABSTRACT

A method of laying a pipe (1) on a sea floor for the transportation of a fluid, having a temperature and/or a pressure exceeding the temperature and pressure of the surroundings involves the pipe (1) being provided with prestressing. This prestressing must be of such an order than it is at least substantially able to neutralize the effect on the pipe (1) of the temperature and the pressure difference during use. Prestressing may be provided by a prestressing device (6) which works between an anchor (7) and a clevis (4) welded onto the pipe.

9 Claims, 2 Drawing Sheets

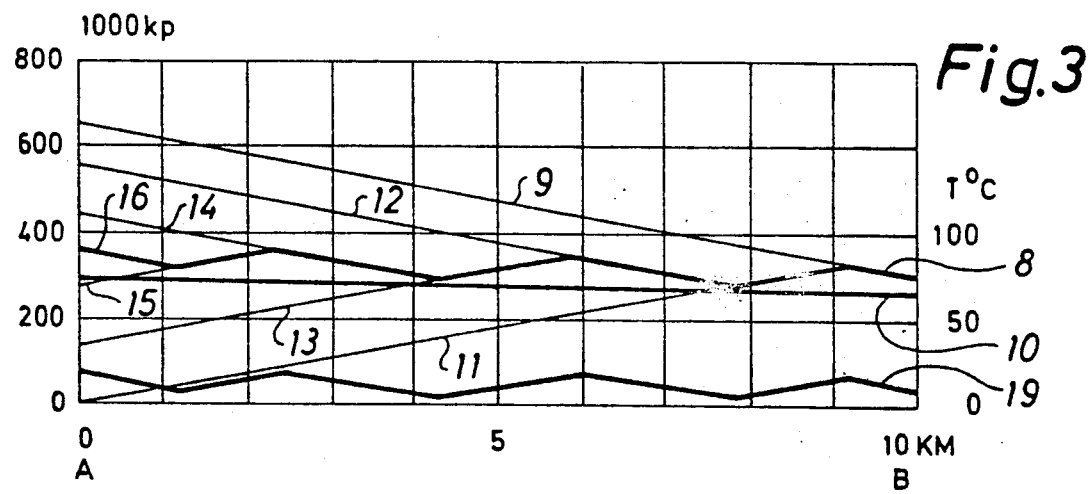
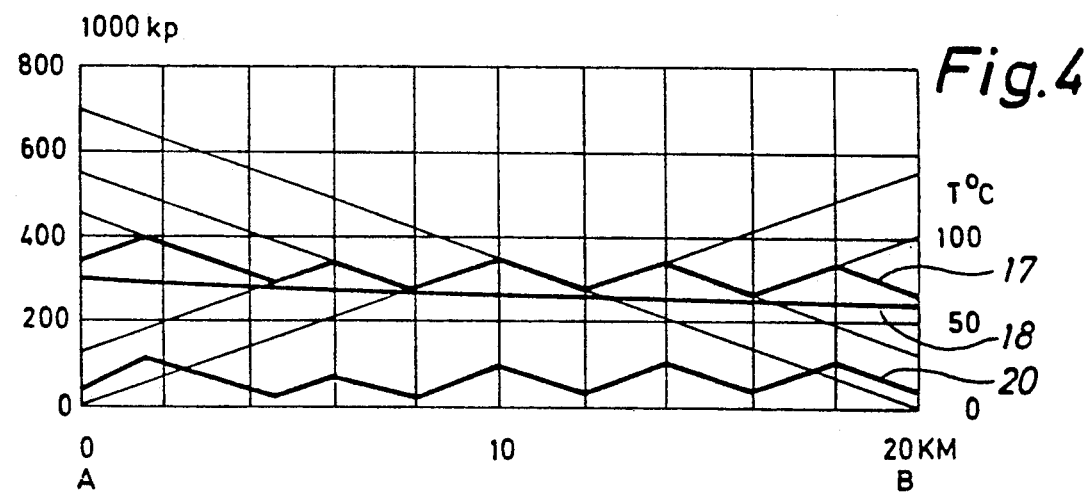
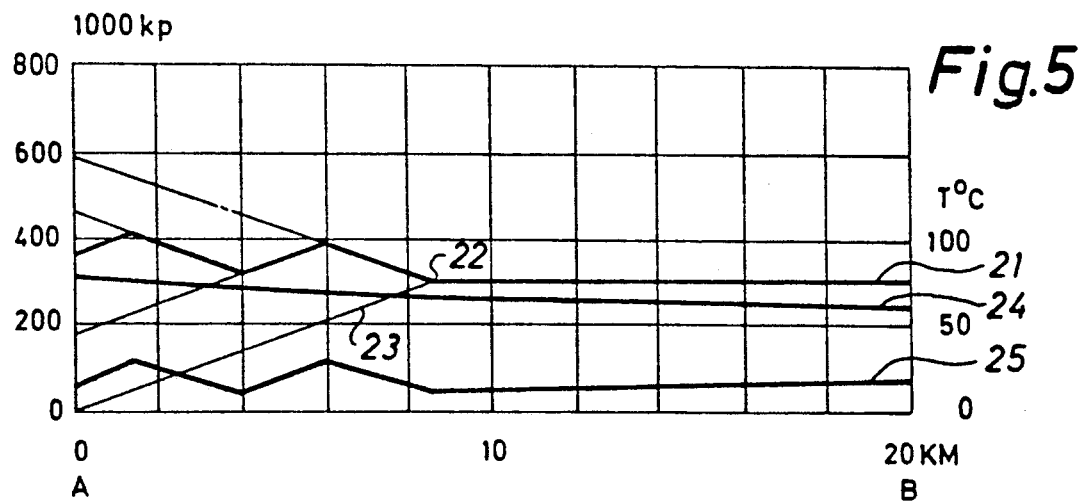

METHOD OF LAYING A PIPE ON A SEA FLOOR FOR THE TRANSPORTATION OF A FLUID

TECHNICAL FIELD

The invention relates to a method of laying a pipe on a sea floor for the transportation of a fluid having a temperature and/or a pressure exceeding the temperature and pressure of the surroundings, by which method the pipe is trenched and buried in the bed of the sea.

BACKGROUND ART

When building a marine oil production installation it is necessary to lay a pipe or a pipeline for the transportation of oil, gas or another fluid from an installation, preferably a satellite field, to another installation, preferably a processing platform. The pipe or the pipeline may consist of two or more pipe sections which are welded together to form a continuous pipe which is laid on the sea floor and subsequently lowered into a trench ploughed therein. After some time the trench sands up and the pipe is typically covered with between one half to one meter of sand. In case of oil or gas from a satellite platform, the fluid is often warm and therefore heats the covered pipeline. If the pipeline has a length of more than a few hundred meters, the pipe is retained by the surrounding area sea bed by means of friction and therefore it cannot expand as a result of the increase in temperature in the pipe wall. Instead, compressive stress develops longitudinally in the pipe wall. The pipeline from a satellite platform is usually dimensioned to resist the full pressure at the well head. The pressure may typically be approximately 200 bar. If such a pipe is heated to a temperature of 75° C. above the temperature of the surroundings, considerable forces develop, for instance in a pipe with a diameter of 325 mm and a wall thickness of 20 mm a compressive force of 300,000 kp develops longitudinally. If the pipe could expand freely, this would correspond to an increase in length of 7.5 m over 10 km. However, as the pipe cannot expand freely, the heating causes the pipe to be unstable and to arch, i.e. to be deformed into an arch or an elbow above the sea floor, thereby damaging the pipeline. The above effect resulting from the temperature of the fluid is also enhanced by the pressure of the fluid in question. In case of a temperature difference of the above order, the influence of the pressure on the pipe is usually of lesser importance than that of the temperature. Therefore, only the temperature is mentioned below as the real source of the problem in question.

In order to prevent the above instability, the pipe may either be ploughed deeper into the sea bed or be covered by a heap of stones thereby preventing the pipe from arching by means of the superjacent sand or stones. Especially the latter method is very costly and time-consuming. Thus, it may be necessary to dump several ship loads of stones for each kilometer of pipeline (e.g. approximately 15 tons each meter). Furthermore, great demands are made on the straightness after the trenching, as small deviations increase the tendency of the pipeline to arch.

It is known from NO-B 136,475 to lay a pipe in a ditch in the ground and to provide said pipe with a predetermined prestressing by heating the pipe from the inside by means of a hot medium before said pipe is covered with earth. Such a method cannot, however, be used for conventional non-insulated pipes to be layed on the sea floor because the lengths of said pipes prevent a heating to the necessary temperatures before said pipes are covered with earth. When the pipe is insulated, the necessary heating can only be ensured at extreme costs.

DE-C2 29 09 475 discloses inter alia a use of double pipelines comprising an inner and an outer pipe, where said pipes are fixed relative to one another once the inner pipe has been prestressed relative to the outer pipe. Usually, such pipes are not used for laying on the sea floor, the latter probably being due to the fact that such pipes are both expensive and difficult to manufacture, and in addition the laying thereof is rather time-consuming because the inner and the outer pipes must be continuously welded together during the laying procedure from the vessel. Furthermore, the outer pipe must necessarily be of a rather thick material in order to withstand the effect of the inner pipe.

Gas Journal-Transmission Distribution, Vol 333, No. 5438, Jan. 17, 1968, "Prestressing pipelines", p 68 to 70, discloses a method of laying a double pipeline under water. When such a pipeline is used for transportation of heated fluids, the inner pipe is prestressed and fixed relative to the outer pipe. Such a pipeline is, however, encumbered with the same instability problems as the known single pipelines layed without any prestressing.

DISCLOSURE OF INVENTION

The object of the invention is to provide a method rendering possible the laying of pipes in such a way that problems with the pipe as a result of heating during use is avoided without the use of costly and time-consuming measures, such as the use of several ship loads of stones.

The method according to the invention is characterized by the pipe being provided with prestressing by pulling before it is buried, said prestressing being at least substantially capable of neutralizing the influence on the pipe as a result of the temperature and pressure difference during use.

As a result, the pipe is in a relatively inexpensive manner provided with such a prestressing, that it is able to compensate for the heating and the pressure and thereby remain stable without special measures being taken. At the same time, a greater certainty of the straightness of the pipe is obtained. Furthermore, the pipeline may be put into use immediately after the trenching and the prestressing without awaiting the pipe sanding up or being covered by stones.

According to the invention the pipe is fixed at one end and after the laying of the pipe said pipe is provided with prestressing by pulling from the other end. As a result, the pipe is provided with prestressing in a simple manner. As the maximum prestressing force at the pulling position is not allowed to exceed the force corresponding to the yield stress, this method is especially used if the pipe laid or the pipeline in question is shorter than, for instance, approximately 10,000 m, dependent on the temperature of the fluid in question during use.

If the pipeline has a length of between approximately 10,000 and 20,000 m, the pipe may according to the invention be provided with prestressing by pulling from both ends after the laying of the pipe.

If the pipe is laid on the sea floor and especially in the case of a pipe with a length exceeding 20,000 m, the pipe may according to the invention be provided with prestressing continuously by means of a pipe-laying barge, the end of the pipe last laid being provided with the required prestressing by pulling from the end.

Furthermore, according to the invention the pipe may be provided with prestressing intermittently by means of the barge, the end of the pipe last laid being provided with the required prestressing from the end. According to the invention, the pipe may first be provided with a preliminary prestressing continuously by means of the vessel and subsequently a final prestressing by pulling from one or both ends.

As a pipeline or a pipe which is prestressed from one of the ends or from both ends is not immediately provided with a prestressing which is substantially constant over the entire pipeline, this may according to the invention be obtained by pulling from the end starting with a high loading force, said loading force ensuring the required prestressing at a portion of the pipe situated far from the pulling position. The prestressing between this far portion and the pulling position is subsequently obtained by means of variable loading of the pipe with a main force, substantially corresponding to the required prestressing and a force amplitude oscillating herearound. The force amplitude initially corresponds to the difference between the first high loading force and said main force, and the amplitude is substantially continuously reduced to 0 under appropriate control, whereby the prestressing everywhere is around the desired value.

BRIEF DESCRIPTION OF DRAWINGS

The invention is described in greater detail below with reference to the accompanying drawings, in which FIGS. 3, 4 and 5 are graphic illustrations of the prestressing, the thermal stress and the resulting tensile stress across the pipeline in its longitudinal direction, prestressing being provided by pulling from one end, pulling from both ends and continuously by means of a pipe-laying barge with final pulling from the end last laid, respectively, and where all Figures show the thermal stress in relation to the temperature of the transported fluid at the place in question inside the pipe.

DETAILED DESCRIPTION OF THE DRAWINGS

Figure 1:
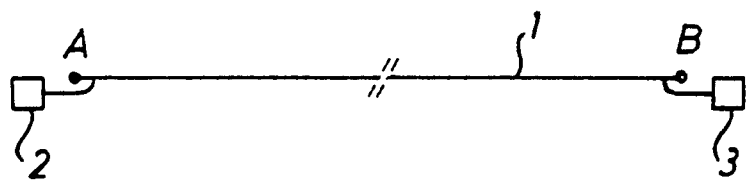
FIG. 1 is a diagrammatic view of a pipeline laid between two installations.

FIG. 1 shows a pipe or a pipeline 1, extending between two points A and B, onto which the pipe is fixed. Near the two points A and B the pipe extends further to platforms 2 and 3, respectively, for instance a satellite platform 2 and a processing platform 3.

Figure 2:
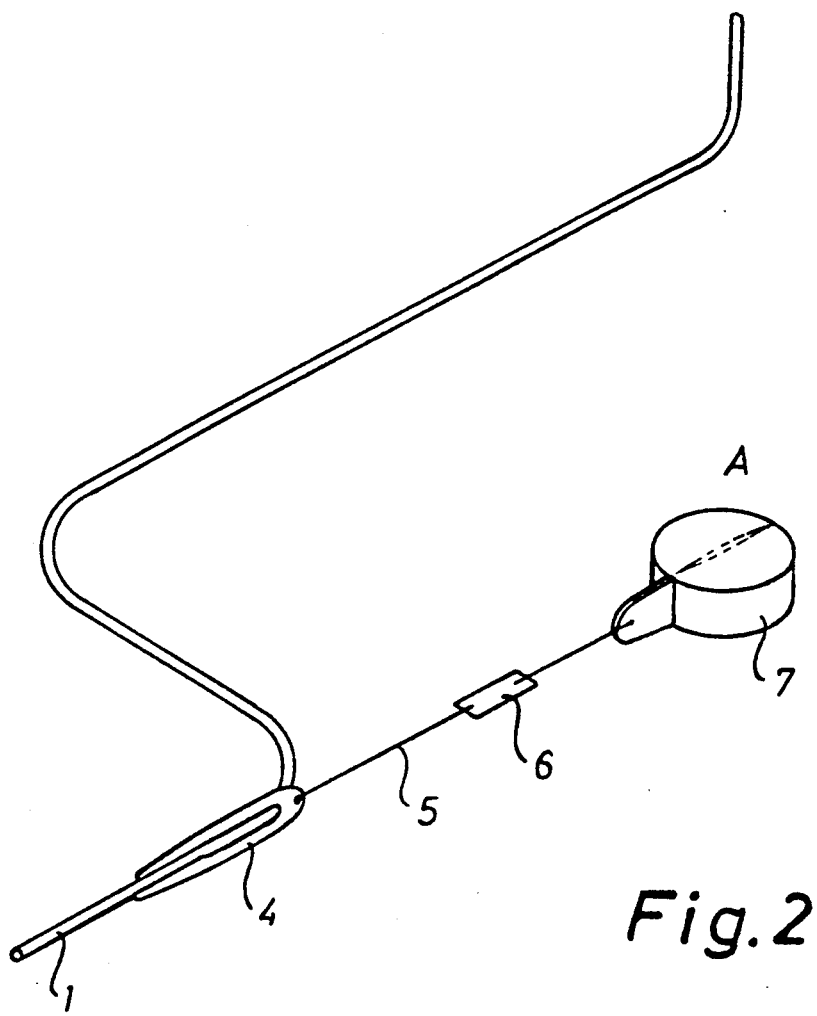
FIG. 2 is a diagrammatic view of the end of a pipeline at the place where it is subjected to tension to provide prestressing.

In FIG. 2 is shown how the pipe 1 is fixed at one of the two points A and B. A substantially U-shaped clevis 4, which straddles the pipe, is welded onto the pipe 1 on diametrically opposite sides of said pipe. The end of the clevis 4 is connected to a wire or chain 5, said wire or chain being connected to an anchoring means 7 via a prestressing means 6. The anchoring means may be of any appropriate type. Said anchoring means may have the form of a big bowl which is placed on the sea floor bottom up and made to adhere to the sea floor by evacuating its interior.

The prestressing means 6 may also be of any appropriate type, such as a strong hydraulic cylinder capable of providing the pipe 1 with the required prestressing.

During the laying of the pipe 1 and/or following the laying of the pipe, the pipe is provided with prestressing of such an order that the prestressing at any point along the pipeline exceeds the stress to which the pipe is subjected as a result of the temperature of the transported fluid in relation to the surroundings, had the pipe not been prestressed. If the pipe is shorter than approximately 10,000 m, the pipe is provided with prestressing after being laid by means of a prestressing means 6 at one end of the pipe, while at the other end the pipe is merely fastened to the sea floor by means of an anchoring means 7. FIG. 3 is a diagrammatic view of the prestressing process, where the full-drawn line 8 shows the completed prestressing as a function of the distance from the end where the pipe is subjected to the prestressing force by means of the prestressing means 6.

When the pipe is laid on the sea floor, it is usually filled with air and the weight in water is typically between 30 per cent and 50 per cent of the weight in air. If the pipe lying on the sea floor before the trenching is provided with prestressing by pulling from one end A, the prestressing decreases in the direction away from the point A as a result of the friction of the pipeline against the sea floor, for instance, as indicated by a weakly drawn line 9 in FIG. 3. The maximum force to which the pipeline can be subjected at the point A must be smaller than the corresponding yield stress at this point. The prestressing at the other end of the pipe B must be larger than the stress to which the pipe is subjected as a result of the temperature in the interior of the pipe during use. A full-drawn curve 10 in FIG. 3 illustrates this temperature-related stress as a function of the distance from the point A. The length over which appropriate prestressing can be provided at the point B by pulling at the point A is thus dependent on the desired prestressing at the point B and the yield stress of the pipe, and as mentioned the prestressing desired at the point B is obtained by pulling at the point A in case of the conventionally used pipe dimensions, if the pipe does not exceed a length of 10,000 m.

In order to ensure that the prestressing everywhere is close to but slightly higher than the temperature-related stress illustrated by the line 10, the pipe may, after being subjected to tension by means of the high load $S_M$ ensuring the required prestressing at the other end B, be subjected to a load corresponding to the desired average prestressing $S_G$, reduced by the difference between the high prestressing load and the average prestressing load, i.e. a load corresponding to the difference between $S_M$ and $S_G$. As a result, the stress curve takes the course indicated by the line 11. By the subsequent application of an alternating load with an oscillating force, this alternating load including to the main force corresponding to the average load $S_G$ and a force amplitude oscillating around the average load $S_G$, said force amplitude being reduced to 0 from the above difference between the high prestressing force and the main force, a prestressing curve corresponding to the curve 8 shown in FIG. 3 can be provided under appropriate control of the extension obtained and the corresponding prestressing force. The curve 8 diagrammatically being illustrated as a zig-zag line is obtained on the basis of successive prestressing lines 12, 13, 14, 15 and 16, corresponding to the stress of a tension oscillating around the main force with gradually decreasing force amplitude. If required, the force amplitude may be reduced more or less continuously, whereby the curve 8 takes an oscillating course more or less close to the desired average prestressing $S_G$.

As shown in FIG. 4, in case of large pipes, for instance up to 20,000 m, it may be necessary to provide the required average prestressing $S_G$ everywhere along the pipe by pulling from both ends A and B of the pipe. As mentioned, this is due to the fact that the yield stress and the friction of the pipe against the sea floor set limits to how far onto the pipe and the required prestressing can be obtained by pulling from the end. As a result, a prestressing line 17 is obtained in the same way as described under reference to FIG. 3, said prestressing line having a zig-zag course around a required average prestressing at an appropriate level above the temperature-related stress curve 18 shown.

Both FIG. 3 and FIG. 4 show a curve 19 and 20, respectively. This curve represents the tensile stress remaining in the pipe after said pipe has been put into use and has been subjected to the temperature-related stress.

If the required prestressing is provided continuously during the laying of a pipe with a length of, e.g. 20,000 m from the point B to the point A, the prestressing curve takes the course represented by the curve 21 in FIG. 5. As appears from this, the prestressing curve 21 is substantially straight up to the point 22 which represents the place on the pipeline which sets limits to how far onto the pipe measured from the end A the final laying of the end A on the sea floor has an effect. If the end of the pipe A is merely laid on the sea floor, the prestressing from the end A to the point 22 takes a course corresponding to the curve 23 in FIG. 5. In order, therefore, to ensure that the required average prestressing $S_G$ is present up to the end A, the prestressing provided by means of the pipe-laying barge should be followed by prestressing provided from the end A, said prestressing being provided by pulling as described under reference to FIGS. 3 and 4. As a result, the prestressing curve 21 takes the zig-zag course shown between the point 22 and up to the end A. As in FIGS. 3 and 4 a curve 24 is shown, said curve representing the effect of the stress as a result of the temperature of the transported fluid, as well as a curve 25, showing the resulting tensile stress in the pipe during use.

Instead of providing the prestressing continuously through the tension means of the pipe-laying barge, prestressing may also be provided by intermittently temporarily fastening a clevis or a flange with an eyelet onto the pipeline, and by means of a wire connected thereto subjecting the pipeline to tension from the pipe-laying barge. As a result, considerably higher tension can be transferred to the pipeline than rendered possible by the continuously working tension means of the barge.

In order to prestress a 325 mm high pressure pipeline sufficiently to compensate for a heating of 75° C., an anchoring force of approximately 600,000 kp during the anchoring operation and a subsequent permanent retaining force of approximately 300,000 kp are required. This can practically be obtained by using an anchoring means 7 of the type described formed as a cylinder covered by a convex end bottom. It is possible to manufacture such an anchor with a diameter of 8 m, a height of 5 m and a weight of 30 tons and to place it on the sea floor by means of a conventional auxiliary vessel. The anchor is pressed into the sea floor by lowering the pressure inside the anchor and pumping out water by means of an ejector or a pump. The above anchor dimensions allow achievement of both a pressing down force of 2,250,000 kp at a water depth of 40 m and a pressure inside the anchor of 0.5 bar and a retaining force of 770,000 kp. During the operation where the tension on the pipeline may be 300,000 kp with a superposed alternating force amplitude of the same order of magnitude, the ejector or pump may be kept working as an extra precautionary measure.

The prestressing means 6 used on the sea floor between the pipeline 1 and the anchoring means 7 may be operated from a pipe-laying barge where both the tension provided as well as the extension of the pipeline can be registered. Furthermore, the force amplitude and the extension amplitude of the pipe are registered whereby the prestressing provided may be calculated at any given point of the pipeline. The prestressing means 6 must have a capacity corresponding to the yield stress of the pipe, i.e. between 600 and 800,000 tons for a 325 mm pipe adapted to 200 bar. The extension of the pipe at an anchoring point may be of the magnitude 10 m.

When the pipe has been provided with the required prestressing, the prestressing means is removed and permanent anchoring the appropriate means is completed.

Prestressing may also be provided as a combination of prestressing during the laying of the pipe and prestressing from anchors at the ends of the pipeline. A predetermined prestressing during the laying of the pipe enhance the straightness with which the pipeline can be laid while on the other hand a coating or insulation of the pipeline restricts the prestressing which can be provided to the pipeline by means of the pipe-laying barge.

Prestressing provided during the laying of the pipeline on the sea floor enhances the straightness of the pipe even though the pipe-laying barge makes minor deviations from the course. A large prestressing compared to the frictional resistance limits the occurence of curvatures of the pipe and thereby the possible reduction of the prestressing by a straightening of the pipe during trenching.

The invention is described with reference to preferred embodiments. Many modifications may be made without thereby deviating from the scope of the invention. For instance, the connection between the prestressing means 6 or the anchoring means 7 and the pipe may be in another form than the clevis 4 shown. The pipe end of the pipeline laid may also be fastened to the platform.

I claim:

1. Method of laying a pipe on a sea floor for the transportation of a fluid having a temperature and/or a pressure exceeding the temperature and pressure of the surroundings by which method the pipe is trenched and buried in the bed of the sea, characterised by the pipe (1) being provided with prestressing by pulling before it is buried, said prestressing being at least substantially capable of neutralizing the influence on the pipe (1) as a result of the temperature and pressure difference during use.

2. Method as claimed in claim 1, characterised by the pipe (1) being fixed at one end B and after the laying of the pipe being provided with prestressing by pulling from the other end A.

3. Method as claimed in claim 1, characterised by the pipe (1) being provided with prestressing by pulling from both ends after the laying of the pipe.

4. Method as claimed in claim 1, characterised by the pipe (1) being provided with prestressing continuously during the laying of the pipe.

5. Method as claimed in claim 4, and where the pipe is laid from a pipe-laying barge, characterised by the pipe (1) being continuously provided with prestressing by means of the pipe-laying barge and by an end A of the pipe (1) last laid being provided with the required prestressing by final pulling from the end.

6. Method as claimed in claim 2, characterised by the pulling from the end A, starting with a first high loading force ($S_M$) ensuring the required prestressing at a portion of the pipe (1) situated far from the pulling position and by the prestressing between this far portion and the pulling position being obtained by means of variable loading of the pipe with a main force substantially corresponding to the required prestressing ($S_G$) and a force amplitude oscillating hereabout, said force amplitude initially corresponding to the difference between the first high loading force and said main force, the amplitude substantially continuously being reduced to zero under appropriate control, whereby the prestressing everywhere is around the desired value.

7. Method as claimed in claim 1, and where the pipe is laid from a pipe-laying barge, characterised by the pipe (1) intermittently being provided with prestressing by means of the barge and by an end of the pipe last laid being provided with the required prestressing from the end.

8. Method as claimed in claim 4, characterised by the pipe initially being provided with preliminary prestressing continuously by means of a vessel and subsequently a final prestressing by pulling from one or both ends.

9. A pipe on a sea floor for the transportation of a fluid having a temperature and/or a pressure exceeding the temperature and pressure of the surroundings; said pipe being trenched and buried in the bed of the sea; said pipe being provided with prestressing by pulling before it is buried, said prestressing being at least substantially capable of neutralizing the influence on the pipe as a result of the temperature and pressure difference during use.

* * * * *

UNITED STATES PATENT AND TRADEMARK OFFICE
CERTIFICATE OF CORRECTION

PATENT NO. : 5,186,580
DATED : February 16, 1993
INVENTOR(S) : Jens J. KAPPEL

It is certified that error appears in the above-identified patent and that said Letters Patent is hereby corrected as shown below:

Col. 4, line 52, delete "to".

Col. 6, line 21, "the" should be --by--.

Col. 6, line 27, "enhance" should be --enhances--.

Signed and Sealed this

Eleventh Day of January, 1994

Attest:

BRUCE LEHMAN

Attesting Officer      Commissioner of Patents and Trademarks